US011138553B2

(12) United States Patent
Wappler et al.

(10) Patent No.: US 11,138,553 B2
(45) Date of Patent: Oct. 5, 2021

(54) GEOLOCATION SPECIFIC ASSET TRACKING WITH TRANSMITTERS

(71) Applicant: Surgere, Inc., Green, OH (US)

(72) Inventors: William Wappler, Green, OH (US);
David Hampton, Ann Arbor, MI (US);
Robert Fink, Hudson, OH (US);
Michael Curran, Canton, OH (US)

(73) Assignee: Surgere, Inc., Green, OH (US)

( * ) Notice: Subject to any disclaimer, the term of this patent is extended or adjusted under 35 U.S.C. 154(b) by 610 days.

(21) Appl. No.: 15/950,454

(22) Filed: Apr. 11, 2018

(65) Prior Publication Data

US 2018/0300673 A1      Oct. 18, 2018

Related U.S. Application Data

(60) Provisional application No. 62/485,236, filed on Apr. 13, 2017.

(51) Int. Cl.
| | |
|---|---|
| *G06Q 10/08* | (2012.01) |
| *G01S 19/42* | (2010.01) |
| *G06K 7/10* | (2006.01) |
| *G01S 19/14* | (2010.01) |
| *G06Q 50/04* | (2012.01) |
| *G01S 13/75* | (2006.01) |
| *H04W 88/02* | (2009.01) |
| *G01S 5/02* | (2010.01) |

(52) U.S. Cl.
CPC .......... *G06Q 10/087* (2013.01); *G01S 13/751* (2013.01); *G01S 19/14* (2013.01); *G01S 19/42* (2013.01); *G06K 7/10366* (2013.01); *G06Q 50/04* (2013.01); *G01S 5/02* (2013.01); *H04W 88/02* (2013.01)

(58) Field of Classification Search
CPC .... G06Q 10/087; G06Q 50/04; G01S 13/751; G01S 19/14; G01S 19/42; G01S 5/02; G06K 7/10366; H04W 88/02
See application file for complete search history.

(56) References Cited

U.S. PATENT DOCUMENTS

| | | | | |
|---|---|---|---|---|
| 2009/0008450 A1* | 1/2009 | Ebert | ....................... | G07C 9/28 235/439 |
| 2014/0074667 A1* | 3/2014 | Smith | ....................... | G01S 5/14 705/28 |

OTHER PUBLICATIONS

Industry Week, https://www.industryweek.com/leadership/companies-executives/article/21947461/rfid-auto-manufacturing, 2008 (Year: 2008).*

(Continued)

*Primary Examiner* — A. Hunter Wilder
*Assistant Examiner* — Joseph M Mutschler
(74) *Attorney, Agent, or Firm* — Clements Bernard Walker; Richard A. Walker; Jacob P. Beers (57) ABSTRACT

A system that utilizes two different types of RFID data capture devices; at least one standard fixed RFID portal (e.g., one reader and two antennas) and at least one handheld or mobile RFID device in combination with passive RFID tags (i.e., transmitters). The system acquires, tracks, and reports asset location specific to a manufacturing plant and storage yard (i.e., the inventory), as well as production milestone events. GPS asset location data is tracked almost continuously and reported on demand.

12 Claims, 1 Drawing Sheet

(56) References Cited

OTHER PUBLICATIONS

Brooks, https://www.brooks.com/applications-by-industry/semiconductor/rfid/rfid-projects/automotive/tracking-and-tracing-at-bmw 2016 (Year: 2016).*

Fraunhofer, https://www.iff.fraunhofer.de/content/dam/iff/de/dokumente/publikationen/forschungskolloquium-2014-fraunhofer-iff.pdf 2014 (Year: 2014).*

* cited by examiner

GEOLOCATION SPECIFIC ASSET TRACKING WITH TRANSMITTERS

CROSS-REFERENCE TO RELATED APPLICATION

The present patent application/patent claims the benefit of priority of co-pending U.S. Provisional Patent Application No. 62/485,236, filed on Apr. 13, 2017, and entitled "GEOLOCATION SPECIFIC ASSET TRACKING WITH TRANSMITTERS," the contents of which are incorporated in full by reference herein.

FIELD OF THE INVENTION

The present invention relates generally to the tracking of assets. More specifically, the present invention relates to the tracking of manufactured items when traveling along a pathway. The present invention provides a system for the tracking of manufactured items with geolocation GPS-based coordinates to increase the likelihood that the correct manufactured item is placed in or removed from a manufacturing facility by a truck or railway, for example.

BACKGROUND OF THE INVENTION

The tracking of inventory is a critical aspect of inventory management. In automotive manufacturing facilities, for example, a newly manufactured car or truck is often stored in a storage lot. From the storage lot, a truck driver may load the newly manufactured car or truck onto a trailer for delivery to an automotive dealership. Alternatively, a train worker could load a newly manufactured car or truck onto a train for later delivery to an automotive dealership. The truck drivers and train workers are often working within tight transportation deadlines, so it is in their interest to pick up the car or truck as quickly as possible. Sometimes, they are merely given the make, model, color, and VIN# of the car or truck to be picked up. However, these storage lots can be very large. Thus, sometimes, the truck driver or train worker will pick up a car or truck that is a similar make, model, and color, but have the incorrect VIN# because they want to leave the storage lot as quickly as possible in order to get on the road/rail and start getting paid.

Thus, issues continue to exist with manufacturing facilities that store large inventories of similar looking manufactured items, such as cars and trucks. A need continues to exist for an improved way to provide delivery personnel with more information so that they know exactly which manufactured item (i.e., vehicle) to pick up and load onto a truck or train, for example. The present invention addresses these and other issues.

BRIEF SUMMARY OF THE INVENTION

In one exemplary embodiment, the present invention provides a system that utilizes two different types of RFID data capture devices; at least one standard fixed RFID portal (e.g., one reader and two antennas) and at least one handheld or mobile RFID device in combination with passive RFID tags (i.e., transmitters). The system will acquire, track, and report vehicle location specific to the manufacturing plant yard (i.e., the inventory), as well as production milestone events.

Users of the system will be able to see vehicle location and produce reports via software provided by the system developer. Additionally, integration will be required to pass vehicle location data, including the vehicles' VIN#s and current location to the manufacturer's current (i.e., legacy) tracking system.

In one exemplary embodiment, two different RFID capture devices will be utilized. Location data will be captured utilizing handheld RFID devices. Milestone data will be captured using RFID portals installed at choke and exit points. Both methodologies require vehicles to be tagged with a RFID tag, and for the tag# and VIN# association to be passed to the central server so that a systematic understanding of what tag# is associated with which vehicle exists in the central database. A scan will be required during the assembly process that marries the RFID tag placed on or near the vehicle's bumper and that same vehicle's VIN# tag via a bar code scan of each. It will be readily apparent to those of ordinary skill in the art that a serial# could be substituted for the VIN# for other manufactured items.

In order to facilitate parking space-specific vehicle location data, the developer of the system should conduct a survey of the plant property and plot the GPS latitude and longitude coordinates of each parking space, as well as all other general or light post-based "quadrants" that will be used to specifically track vehicle location. Overflow and repair areas will utilize a quadrant approach whereby the property is divided into quadrants, for example that are 50 feet by 50 feet, and the current location of vehicles in these areas will be available at a quadrant level (e.g., VIN 2313432123412312 is currently in Repair—Quadrant 10).

The location accuracy provided as part of the system will be specific to the classification of the area. In some cases, users will be able to see a map of the plant property, and search for vehicles by VIN#. The search will return the location of the vehicle as last reported via scan.

Some variations in location accuracy may be intentional so as to reduce the need to the lowest degree possible for human intervention. Vehicle location in the inventory and truck away and rail away areas will be provided at a parking space-specific level plus or minus 3 meters, for example. For example, VIN#1234567891234567 is currently parked in spot A23. Employees will walk the parking lot with an RFID handheld that is deliberately configured with low read power. Using this RFID handheld, the user will be able read and obtain tag data from all vehicles parked in these areas of the plant. The low power will require the user to get within 3-4 feet of the tag to be able to read it. The proximity of handheld to tag will allow the system to capture the current GPS coordinates of the read, which are passed to the database at a level of granularity capable of producing parking lot-specific location plus or minus 3 meters of deviation.

Vehicle location in designated overflow and repair areas will be recorded at a quadrant level. The size of each quadrant and the number of total quadrants to be incorporated will be determined based on the size of the facility. This approach allows employees to utilize a handheld signal scanner (i.e., a transceiver) with a higher RFID signal or power setting. The higher power setting enables the user to get within 20-25 feet of the vehicle and acquire tag reads from a moving vehicle at a rate of speed typically associated with a golf cart or other people moving vehicle.

Legacy or existing light posts or the like can be labeled throughout the property to give employees visual cues of the quadrant boundaries. To find a vehicle parked in a certain quadrant or anywhere on the plant property, users will be able to utilize a seek and find feature on a handheld device to locate the vehicle. This may operate like a metal detector, for example, and starts making an audible noise more frequently when the user is near the vehicle that they are looking for. Alternatively, the handheld device can indicate to the employee in which spot the vehicle is located. Searches will be able to be facilitated by VIN# or RFID tag#.

Fixed RFID transceivers and/or portals include one RFID reader and at least two antennas per portal (however, a single antenna is also possible). Handheld mobile computers and mobile RFID data capture devices may be tethered together to produce simultaneous tag and latitude/longitude reads. Barcode scanners are installed near the assembly line to associate RFID tags to VIN# tags. Saturated plant Wi-Fi is utilized to pass RFID tag and VIN# associations to the database. RFID tags may be installed on the windshield or near the bumper (e.g., one per vehicle). Cellular modems are used for all fixed RFID portals that are outside of the plant or away from the plant network. Battery packs or solar powered batteries are used for all fixed portals that are not located near available AC power.

Software functionality will be available in Container Optimization Solutions (COS) software. The COS software may be a web-based application. An instance of COS will be customized for the manufacturing facility to add some of the above functionality, however there are several areas that will be turnkey and be available without further development.

The system may use Simple Object Access Protocol (SOAP) or Representational State Transfer (REST) web services to integrate with customers as they are scalable and easily deployed but are open to other methods and have experience with the same.

BRIEF DESCRIPTION OF THE DRAWINGS

A non-limiting sample embodiment of the present invention is set forth in the following detailed description, is shown in the conceptual drawing, and is particularly and distinctly pointed out and set forth in the appended claims. The accompanying drawing, which is fully incorporated herein and constitutes a part of the specification, illustrates various examples, methods, and other example embodiments of various aspects of the present invention. It will be appreciated that the illustrated element boundaries (e.g., boxes, groups of boxes, and/or other shapes) in the FIGURE represent one example of such boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar reference numbers refer to similar parts/steps throughout the drawings, as appropriate.

DETAILED DESCRIPTION OF THE INVENTION

Figure 1:
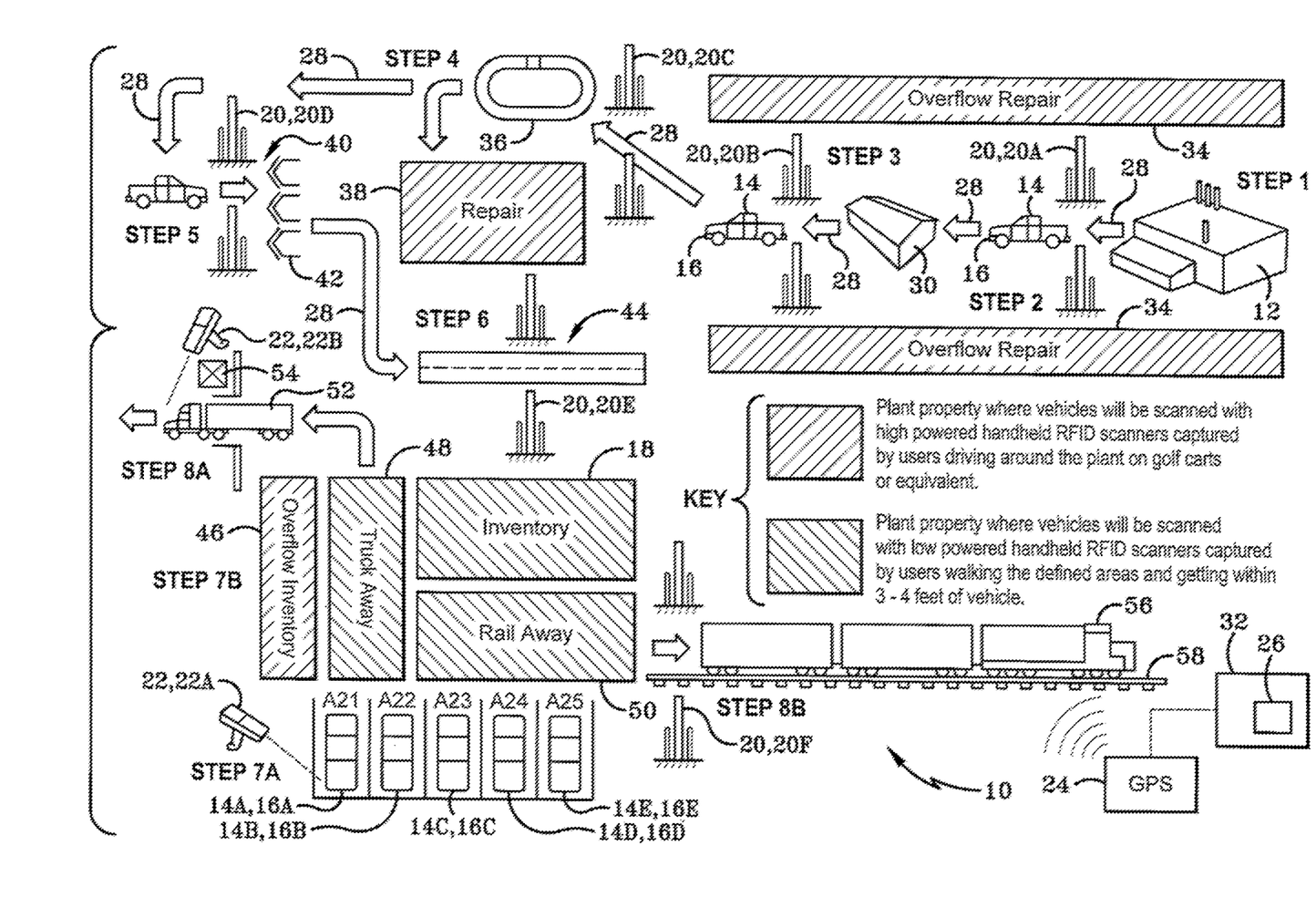
FIG. 1 is a diagrammatic flow chart of a system for location-specific asset tracking with transmitters and transceivers in accordance with the present invention.

The system of the present invention is shown generally in FIG. 1 as 10. The system 10 may include a manufacturing facility 12 producing a manufactured item 14 carrying a transmitter 16, a storage lot 18 that is exterior to the manufacturing facility 12 for storing the manufactured item 14, at least one fixed transceiver 20, at least one portable transceiver 22, a global positioning system (GPS) 24, at least one non-transitory computer readable storage medium 26 having instructions encoded thereon, that when executed by one or more processors (which may also be referred to as "tracking logic") track the location of the manufactured item 14 relative to the manufacturing facility 12 and the external storage lot 18. The system 10 incorporates a pathway 28 extending between components of the system 10 and relative terms such as upstream or downstream may be used for reference purposes to explain some components relative to others with respect to movement of the manufactured item 14 along the pathway 28.

The manufacturing facility 12 may be building or structuring typically having upstanding exterior facing sidewalls having opposed outer and inner surfaces defining an interior space. Within the interior space of the manufacturing facility 12 is typically where a primary portion of the manufactured item 14 is assembled or fabricated. In one non-limiting example, the manufacturing facility 12 may be a automobile manufacturing facility. In this instance, the manufactured item 14 made in the facility 12 would be cars, trucks, or the like.

During the fabrication of the manufactured item 14, the transmitter 16 may be installed thereon or otherwise connected thereto. As will be described in greater detail below, the system 10 includes encoding logic configured to associate the transmitter 16 with item specific identifiers, such as a vehicle identification number (VIN#), or a serial# foe other manufactured goods. One exemplary transmitter 16 is a radio frequency identification (RFID) chip or tag. However, it is entirely understood that other transmitters 16 associated with identifying information of the manufacturing item 14 are entirely possible. In one example, the transmitter 16 is associated with GPS coordinates from GPS 24 so as to allow the system 10 to know the geolocation of the transmitter 16 connected to the manufactured item 14 at any given time. For example, when the transmitter 16 is an RFID tag, and the manufactured item 14 is a vehicle in a manufacturing plant 12, the transmitter 16 is attached to the vehicle and associated with the VIN# of the vehicle and the GPS 24 calculates the location of the vehicle within the interior of the manufacturing facility 12.

The manufacturing facility 12 may define at least one opening in the exterior sidewalls that is sized to permit ingress and egress of manufactured items 14 to enter and exit the facility 12. Typically, the opening is used to permit manufactured items 14 to leave the facility 12 and be transported to the exterior storage lot 18. Furthermore, in one example, the manufactured items 14 exiting the manufacturing facility 12 travel along the pathway 28, which is also sometimes referred to as a "leaving line." The leaving line may pass through the opening in the exterior wall of the manufacturing facility 12. The pathway 28 is sized to permit the manufactured items 14 to move therealong. Furthermore, in one example, the pathway 28 extends from the manufacturing facility 12 to the exterior storage lot 18.

The at least one fixed transceiver 20 may be installed near the opening and proximate the leaving line or pathway 28. In one embodiment, the at least one fixed receiver 20 is positioned within the interior of the manufacturing facility 12 near the opening. In another embodiment, the at least one fixed transceiver 20 is positioned exterior the manufacturing facility 12 near the opening. As will be described in greater detail below, as the manufactured item 14 travels along the pathway 28, the transmitter 16 transmits signals associated with the unique identifier of the manufactured item 14 and its GPS determined location. Thus, the at least one fixed transceiver 20 is able to determine the location and directional movement of the manufactured item 14 along the pathway 28.

In one example, a secondary facility 30 may be positioned along the pathway 28 downstream from the manufacturing facility 12. In one example, the secondary facility 30 is a logistics facility. When the secondary facility 30 is a logistics facility, the system 10 may determine what logistical information will be implemented to effectuate the delivery of the manufactured item 14 to an end destination, which is downstream from the manufacturing facility 12. A second fixed transceiver 20B is positioned along the pathway 28 near the secondary facility 30. The second fixed transceiver 20B may be located either within the interior of the secondary facility 30 or may be located exterior to the secondary facility 30. In each instance, the second transceiver 20B receives transmitted information from the transmitter 16 (i.e., the RFID tag) on the manufactured item 14 (such as the vehicle). As will be described in greater below, the second transceiver 20B may transmit the vehicle's information, including GPS-based geolocation, to a central server 32 of the system 10 coupled with the at least one non-transitory storage medium 26.

An overflow repair facility 34 may be positioned along the pathway 28. The overflow repair facility 34 may be configured to repair the manufactured item 14 in response to a notification that the manufactured item 14 does not meet desired quality or standards during the manufacturing process in the manufacturing facility 12. FIG. 1 depicts via graphical shading that the overflow repair facility 34 may be "plant property," wherein transportation vehicles (such as golf carts, people movers, or the like) carry factory personnel carrying handheld portable transceivers 22. The handheld transceivers 22 receive transmitted information from the transmitter 16 on the manufactured item 14 (such as the automobile in the overflow repair facility 34).

In another example, a testing facility 36 may be positioned along the pathway 28 downstream from the manufacturing facility 12. In yet another example, the testing facility 36 is downstream from the secondary facility 30. The testing facility 36 is configured to test the quality of the manufactured item 14 against a set of standards that may be set by either the manufacturer or a government entity. For example, in the example of a vehicle as the manufactured item 14, the quality of the vehicle may be required to meet certain company standards, as well as governmental standards, such as emissions ratings, crash ratings, other safety standards, or the like. A third fixed transceiver 20C is positioned along the pathway 28 near the testing facility 36. The third fixed transceiver 20C may be located either within the interior of the testing facility 36 or may be located exterior to the testing facility 36. In each instance, the third transceiver 20C receives transmitted information from the transmitter 16 (i.e., the RFID tag) on the manufactured item 14 (such as the vehicle). As will be described in greater detail below, the third transceiver 20C may transmit the vehicle's information, including GPS-based geolocation, to the central server 32 of the system 10 coupled with the at least one non-transitory storage medium 26.

A repair facility 38 may be located along a portion of the pathway 28. In the event that the testing facility 36 determines that the manufactured item 14 fails to meet initial quality standards based on the test track results, such as if the emissions requirements are not met or if the engine performance thresholds are not met, then the item 14 may be sent to the repair facility 38 for repair. FIG. 1 depicts via graphical shading that the repair facility 38 may again be "plant property," wherein transportation vehicles (such as golf carts, people movers, or the like) carry factory personnel carrying handheld portable transceivers 22. The handheld transceivers 22 receive transmitted information from the transmitter 16 on the manufactured item 14 (such as the automobile) in the repair facility 38.

A pay point station or facility 40 may be located downstream from the test facility 36. The pay point facility 40 may include a plurality of bays 42 configured to at least temporarily store the manufactured item 14. The pay point station 40 may capture and record event information pertaining to the manufactured item 14. A fourth fixed transceiver 20D is positioned along the pathway 28 near the pay point station 40. The fourth fixed transceiver 20D may be located either within the interior of the pay point station 40 or may be located exterior to the pay point station 40. In each instance, the fourth fixed transceiver 20D receives transmitted information from the transmitter 16 (i.e., the RFID tag) on the manufactured item 14 (such as the vehicle). As will be described in greater detail below, the fourth transceiver 20D may transmit the vehicle's information, including GPS-based geolocation, to the central server 32 of the system 10 coupled with the at least one non-transitory storage medium 26.

A checkpoint 44 is downstream from the pay point station 40 along the pathway 28. In one example, the checkpoint 44 is a choke point in a road where the manufactured items 14 pass along while moving along the pathway 28. The checkpoint 44 may be a raised portion of a road so as to all the manufactured item 14 (such as the newly manufactured vehicle) is to be driven "over the hill." A fifth fixed transceiver 20E is positioned along the pathway 28 near the checkpoint 44. In one example, the fifth fixed transceiver 20E may be installed beneath the road surface such that when the manufactured item 14 passes "over the hill" or otherwise moves along near the fifth fixed transceiver 20E, the transmitter 16 passes the identifying information to the central server 32 to indicate that the manufactured item 14 is moving along the pathway 28 through the checkpoint 44 and towards the inventory lot 18. In another example, the fifth fixed transceiver 20E may be located either within the interior of the checkpoint 44 or may be located exterior to the checkpoint 44. In each instance, the fifth transceiver 20E receives transmitted information from the transmitter 16 (i.e., the RFID tag) on the manufactured item 14 (such as the vehicle). A s will be described in greater detail below, the fifth transceiver 20E may transmit the vehicle's information, including GPS-based geolocation, to the central server 32 of the system 10 coupled with the at least one non-transitory storage medium 26. Furthermore, the tracking logic of system 10 is able to establish that the manufactured item 14 is being placed into the inventory lot 18 and whether the manufactured item 14 is to be put into the queue for being hauled away via transportation truck or whether the manufactured item 14 is to be railed away via train.

The storage lot 18 may also be referred to an inventory lot or queue. The storage lot 18 is along the pathway 28 downstream from the checkpoint 44. In one example, the storage lot 18 is a parking lot that is distinct and separate from the manufacturing facility 12. When the manufactured items 14 are vehicles, the storage lot 18 is sized to store vehicles within parking spots painted atop a ground surface or paved surface. The storage lot 18 is further sized to enable an operator to traverse the storage lot 18 with the at least one portable transceiver 22. An operator or employee of the operator may walk the lot or may ride the lot in a golf cart or other similar people moving cart. In one example, the at least one portable transceiver 22 may be a handheld RFID scanner. The handheld RFID scanner may capture and transmit the current location of the manufactured item 14 (i.e., the vehicle) to a central server 32. Alternatively, the handheld RFID scanner 22 may record the vehicle location to an internal memory on the handheld RFID scanner 22 for later transmission into the central processing unit or server 32. In one example, the handheld RFID scanner 22 may also determine which "spot" the vehicle is located in based on the GPS coordinates that are associated with the transmitter 16. For example, as indicated in FIG. 1, a first vehicle 14A having a first transmitter 16A may be read from the RFID scanner 22A to indicate that the first vehicle 14A is located in spot A21 associated with a first GPS-based geolocation. A second vehicle 14B having a second transmitter 16B may be read from the RFID scanner 22A to indicate that the second vehicle 14B is located in spot A22 associated with a second GPS-based geolocation. A third vehicle 14C having a third transmitter 16C may be read from the RFID scanner 22A to indicate that the third vehicle 14C is located in spot A23 associated with a third GPS-based geolocation. A fourth vehicle 14D having a fourth transmitter 16D may be read from the RFID scanner 22A to indicate that the fourth vehicle 14D is located in spot A24 associated with a fourth GPS-based geolocation. A fifth vehicle 14E having a fifth transmitter 16E may be read from the RFID scanner 22A to indicate that the fifth vehicle 14E is located in spot A25 associated with a fifth GPS-based geolocation.

An overflow inventory area 46 is located adjacent the "inventory" or storage lot 18. The overflow inventory area 46 is "plant property" where manufactured items 14 will be scanned with high-powered handheld RFID scanners 22 or equivalents by an operator or employee. The overflow inventory area 46 is configured to store manufactured items 14, such as vehicles, that are in excess to the storage capacity of the storage lot 18. The overflow area 46 is selectively filled when the inventory storage lot 18 is full, otherwise, the overflow area 46 may not be utilized.

Downstream along the pathway 28 from the inventory storage lot 18 is a truck away area 48 and a rail away area 50. The truck away area 48 and the rail away area 50 are "plant property" where manufactured items 14 (such as vehicles) carrying individual respective transmitters will be scanned with the at least one portable transceiver 22, such as a handheld RFID scanner. The portable transceiver 22 captures identifying information including GPS-based geolocation coordinates. In one instance, the truck away area 48 and the rail away area 50 permit users to walk in defined areas to obtain the identifying information when the user is within about 5 feet of the vehicle or within about 10 feet from the transmitter 16 carried by the vehicle.

The truck away area 48 may be closely adjacent the storage lot 18 and in one embodiment may simply be a region within the storage lot 18. In another embodiment, the truck away area 48 may have parking spots drawn on the surface thereof. The geolocation of each parking spot within the truck away area 48 may be pre-uploaded into the central server 32 or central computer. This enables the central server 32 to determine which spot the vehicle is within in the truck away area 48 when an operator scans the transmitter 16 with the at least one portable transceiver 22.

With continued reference to the truck away area 48, a truck driver operating a tractor trailer 52 may enter the truck away area 48 with instructions, such as a work order or purchase order, to pick up a certain vehicle. By way of example, in previous circumstances, a work order may have indicated to pick up a black NISSAN ALTIMA having VIN#123456789. However, when the truck driver was in the truck away area 48, it was difficult to find the exact vehicle. Thus, the truck driver may accidentally load a black NISSAN ALTIMA having VIN#987654321 onto the tractor trailer 52. Thus, the end user (such as a NISSAN car dealership) would receive the incorrect order (although it could be similar because it was still a black NISSAN ALTIMA, but the wrong VIN#). The system 10 eliminates these exemplary errors amongst other advantages.

Inasmuch as the system 10 associates GPS coordinates from the GPS 24 with the transmitter 16, when the manufactured item 14 (i.e., such as a NISSAN ALTIMA) is transported to the truck away area 48, the central server 32 knows exactly which spot the vehicle is positioned within. Thus, the truck driver may now be given the work order that says to load a black NISSAN ALTIMA having VIN#123456789 located in an exact location, such as first spot A21, or the like. This should ensure that the downstream end destination, such as the NISSAN dealership, receives the proper ordered vehicle.

A guard shack 54 may be located near the exit of the truck away area 48. In one example, another portable transceiver 22B may be utilized to scan the transmitter 16 on the vehicle that is being removed from the truck away area 48. Alternatively, another fixed transceiver 20 may be installed near the guard shack 54 to scan and capture information from the transmitter 16 on the vehicle as it is being hauled away.

The rail away area 50 may be located closely adjacent the inventory storage lot 18. In one example, the rail away area 50 may be located within the storage lot 18. A sixth fixed transceiver 20F may be installed along the pathway 28 near an exit of the rail away area 50. The sixth fixed transceiver 20F may be located either within the interior of the rail away area 50 or may be located exterior to the rail away area 50. In each instance, the sixth fixed transceiver 20F receives transmitted information from the transmitter 16 (i.e., the RFID tag) on the manufactured item 14 (such as the vehicle). As will be described in greater detail below, the sixth transceiver 20F may transmit the vehicle's information, including GPS-based geolocation, to a central server 32 of the system 10 coupled with the at least one non-transitory storage medium 26.

A train 56 on a rail 58 may be located near the exit of the rail away area 50. A train engineer or train driver or other train personnel may have a work order which indicates the exact item to be loaded onto the train 56 and its exact geolocation within the rail away area 50. This ensures that the person loading the manufactured item 14 onto the train 56 does not accidentally load the wrong manufactured item 14.

In one exemplary operation, the system 10 begins when the manufacturer finishes manufacturing the item 14. During the finishing, the manufacturer applies transmitter 16 to the item 14. The manufacturer or a computer automatically codes or programs the transmitter 16 to include identifying information, such as a VIN#, to the signal that is to be transmitted by the transmitter 16. In one example, the programming of the transmitter 16 is accomplished by scanning the transmitter 16 with a handheld scanner 22. The scanning of the VIN# and the transmitters 16 associates the two together, and the associated information may be transferred from the handheld transceiver 22 to a central database 32 or central server having program logic and the at least one non-transitory storage medium 26 having instructions encoded thereon that when executed by one or more processors perform operations to identify and track the geolocation of the manufactured item 14. The central database 32 stores the vehicle information in a format configured to easily recall and obtain information therefrom for later use. Furthermore, the transmitter 16 geolocates its position based on the GPS 24 and provides the geolocation to central server 32.

The operator installs fixed transceivers 20 at various locations within or near the manufacturing facility 12, the repair facilities 34 or 38, the overflow facilities 46, or other areas throughout the manufacturing plant property. Alternatively, when retro-fitting the system 10 of the present disclosure to an existing manufacturing facility, the fixed transceivers 20 may be connected to existing legacy structures so as to allow them to draw power from existing power networks. For example, the fixed transceivers 20 may be connected to existing lamp posts, light fixtures, lighted signs, garage doors, or other items that could structurally support a fixed transceiver 20 and has an existing legacy power grid. In one implementation, the fixed transceivers 20 are strategically placed to capture milestone events, such as the completion of the manufacture, an occurrence of repair, or the movement of the item from one location to another, as well as the geolocation of the item based on GPS-coordinates associated with the transmitter 16.

In areas with physical locations within or nearly outside the manufacturing plant property grounds, a handheld portable transceiver 22 may be used by an operator to capture information from the transmitter 16 on the manufactured item 14. In one example, the handheld portable transceiver 22 is an RFID scanner that scans and captures information from an RFID tag (i.e., transmitter 16) on a vehicle. The portable transceiver 22 may also capture serialized information from the transmitter 16 which is encoded with vehicle identifying information. The central server 32 may sync or otherwise marry the vehicle identifying information (such as the VIN#) with GPS based geolocation coordinates to establish a precise location of the manufactured item 14 and record and store the same in a memory of the central server 32.

The GPS-based geolocation coordinates are used by the central server 32 or another processor to query the manufacturer's database to determine the exact location of the manufactured item 14 within either the inventory storage lot 18, or the rail away area 50, or the truck away area 48. The coordinates are also associated with the specific parking spots so as to allow users to know a spot location of the manufactured item 14, such as a vehicle. In one example, associating the parking spot with the transmitter 16 is accomplished by cross referencing at least one read attribute with survey data captured by an installer during a pre-launch visit/survey of the plant property. The survey data may be gathered in accordance with known methods or tools implementing surveying methods such as a cosmolabe, a dioptra, a theodolite, a half theodolite, a plain theodolite, a simple theodolite, a great theodolite, a non-transit theodolite, a transit theodolite, a seconds theodolite, a electronic theodolite, a mining theodolite, a suspension theodolite, a traveling theodolite, a pibal theodolite, a registering theodolite, a gyro-theodolite, a construction theodolite, a photo-theodolite, a robotic theodolite, a vernier theodolite, a tachymeter (surveying), a graphometer, a universal instrument (surveying), a rransit (surveying), a total station, an alidade, an alidade table, a plane table, a dumpy level, a tape (surveying), a measuring tape, a surveyor's chain, an engineer's chain, one or more ramsden surveying instruments, and/or a ranging rod. In one embodiment, the installer of system 10 obtains hundreds, thousands, or tens of thousands of surveying readings using some of the aforementioned surveying tools to map the entire plant property into generalized and finite locations such as parking spot A21 or a "put away location." During the survey of plant property, existing legacy fixtures, such as lamp posts may be utilized to divide areas in to a plurality of different quadrants. In one example, the survey of the plant property plots the GPS latitude and longitude coordinates of each parking spot as well as all other general or light post based "quadrants" that will be used to track the location of the manufactured item 14 (i.e., the vehicle). Overflow and repair areas may also utilize a quadrant approach. In this instance, the property may be divided into quadrants for example that are 50 feet by 50 feet and the current location of vehicles in these areas will be available at a quadrant level (e.g. VIN 2313432123412312 is currently in repair—which may be quadrant 10 of 15).

The survey plots may be inlaid with a geographic view of the plant property obtained from satellite imagery, such as Google Earth or the like. The location accuracy can be graphed on this same map to enable the manufacturer to see the location of the manufactured item 14 based on GPS-based geolocation of the item 14 represented in the computer generated projection map registered with satellite imagery. Similarly, users will be able to see a map of the plant property, and search for vehicles by VIN#. The search will return the location of the vehicle as last reported via scan.

In operation and with reference to the diagrammatic flow chart of FIG. 1, a transmitter 16, such as an RFID tag, is applied to the manufactured item 14 during assembly thereof. In one example, the transmitter 16 may be applied to the windshield or bumper adjacent the VIN#. Near the same time, the transmitter 16 is associated with the unique identifier so at to enable the transmitter 16 to provide the location of the manufactured item 14. Collectively, these steps are generally shown at "STEP 1" of FIG. 1.

The manufactured items 14 exit the manufacturing facility 12 along the pathway 28 to establish a leaving line. The manufactured items 14 exiting the facility 12 are captured by the first fixed transceiver 20A configured to receive signals from the transmitters 16 carried by the manufactured items 14 and sent the unique identifying information and GPS-based geolocation of the manufactured item 14 to the central server 32 or database. In one implementation, the manufacturing facility 12 may have four outbound doors, wherein each door is equipped with a nearby fixed transceiver 20. These steps are collectively shown at "STEP 2" of FIG. 1. In one implementation, STEP 2 occurs subsequent to STEP 1, however it may be possible for these steps to occur in a different order.

The manufactured item(s) 14 continue along the pathway 28 towards the secondary facility 30. Within the secondary facility 30, the manufacturer determines where the manufactured items 14 will be delivered to an end customer (such as a car dealership). As one having ordinary skill in the art understands, other logistical determinations may be associated with the manufactured item 14. The manufactured items 14 may then exit the secondary facility 30. The items exiting the secondary facility 30 are captured by the second fixed transceiver 20B configured to receive signals from the transmitters 16 carried by the manufactured items 14. These steps are collectively shown at "STEP 3" of FIG. 1. In one implementation, STEP 3 occurs subsequent to STEP 2, however it may be possible for these steps to occur in a different order.

The manufactured items 14 continue along the pathway 28 towards the testing facility 36 from the secondary facility 30. The signals from the transmitters 16 on manufactured items 14 entering (or exiting) the testing facility 36 are captured by a third fixed transceiver 20C. Within the testing facility 36, the manufactured items 14 are tested against a set of thresholds. For example, some non-limiting exemplary thresholds include emissions standards as determined by regulatory agencies. In the event that the manufactured item 14 fails to meet or exceed the testing thresholds, it is sent to the repair facility 38. Within the repair facility 38, the manufactured item 14 may be repaired to bring it up to acceptable standards. Then, the manufactured item 14 may be sent back to the testing facility 36 to be re-tested against the set of threshold. If the manufactured item 14 does not pass the test, then it is sent back to the repair facility 38. This process is repeated until the manufactured item 14 passes the tests. Once all the tests have been successfully passed, the manufactured item 14 continues along the pathway 28d. These steps are collectively shown at "STEP 4" of FIG. 1. In one implementation, STEP 4 occurs subsequent to STEP 3, however it may be possible for these steps to occur in a different order.

The manufactured items 14 continue along the pathway 28 from the testing facility 36 and move towards the pay point station 40. The fourth fixed receiver 20D is positioned along the pathway 28 near pay point station 40 so as to allow the manufactured items 14 to pass thereby and fourth fixed receiver 20D records the same. The manufactured items 14 may be stored, at least temporarily, in one or more bays. The fourth fixed receiver 20D may transmit signals from the transmitters 16 carried by the manufactured items 14 and send the unique identifying information (such as VIN#) and GPS-based geolocation of the manufactured item 14 to the central server 32 or database. These steps are collectively shown at "STEP 5" of FIG. 1. In one implementation, STEP 5 occurs subsequent to STEP 4, however it may be possible for these steps to occur in a different order.

The manufactured items 14 continue along the pathway 28 from the pay point station 40 towards the checkpoint 44. The checkpoint 44 may include a slight hill or raised portion so that the manufactured items 14 may pass "over the hill." At the checkpoint 44, the manufactured items 14 may pass through or by the fifth fixed receiver 20E. In one implementation, the manufactured items 14 pass through the fifth fixed receiver 20E when the items 14 pass over the hill of the checkpoint 44. The fifth fixed receiver 20E may transmit signals from the transmitters 16 carried by the manufactured items 14 and send the unique identifying information (such as VIN#) and GPS-based geolocation of the manufactured item 14 to the central server 32 or database. These steps are collectively shown at "STEP 6" of FIG. 1. In one implementation, STEP 6 occurs subsequent to STEP 5, however it may be possible for these steps to occur in a different order.

The manufactured items 14 continue along the pathway 28 from the checkpoint 44 to the inventory area or the storage lot 18. The manufactured items 14 may remain in the storage lot 18 or may move to a different area, such as the rail away area 50 or the truck away area 48. From the storage lot 18, the manufactured items 14 may move to the truck away area 48 or the rail away area 50. When the manufactured items 14 are in the storage lot 18, the truck away area 48, or the rail away area 50, a person may walk in these area with the at least one portable transceiver 22A. In one implementation, the at least one portable transceiver 22A is a handheld RFID scanner. The handheld portable transceiver 22A is configured to transmit signals from the transmitters 16 carried by the manufactured items 14 and send the unique identifying information (such as VIN#) and GPS-based geolocation of the manufactured item 14 to the central server 32 or database. Furthermore, at this stage, the database or central server 32 may associate the location of the manufactured item 14 with the known parking spots that were previously established in the pre-launch survey performed by the company installing system 10. For example, the first manufactured item 14A may be stored in a parking spot A21 and this location may be transmitted to the central database 32 or server. The second manufactured item 14B may be stored in a second parking spot A22 and this location may be transmitted to the central database 32 or server. The third manufactured item 14C may be stored in a third parking spot A23 and this location may be transmitted to the central database 32 or server. The fourth manufactured item 14D may be stored in a fourth parking spot A24 and this location may be transmitted to the central database 32 or server. The fifth manufactured item 14E may be stored in a fifth parking spot A25 and this location may be transmitted to the central database 32 or server. These steps are collectively shown at "STEP 7A" of FIG. 1. In one implementation, STEP 7A occurs subsequent to STEP 6, however it may be possible for these steps to occur in a different order.

Employees may walk or ride in golf carts/people movers with a handheld transceiver 22A in the overflow inventory lot 46, or the storage lot 18, or the truck away area 48, or the rail away area 50. The handheld transceiver 22A captures the location of the manufactured items 14 in a general manner to within about 10 feet to 20 feet accuracy. In one example, the frequency of the this scanning occurs once daily, however other frequencies are entirely possible. These steps are collectively shown at "STEP 7B" of FIG. 1. In one implementation, STEP 7B occurs generally simultaneous, or near a similar time with STEP 7A, however it may be possible for these steps to occur in a different order.

Some of the manufactured items 14 may be positioned in the truck away area 48. When a truck driver needs to pick up one or more of the manufactured items 14 from the truck away area, the manufacturer or plant property owner may provide a list of parking spot locations to the truck driver. The parking lot locations of the manufactured items 14 (i.e., vehicles) are previously created and stored in the database based on the GPS-based geolocation coordinates registered against the previously surveyed parking lot spaces. By providing the truck driver with the exact spot of the vehicle that he needs to pick up and load onto the truck, the system 10 should eliminate any guess work by the driver as to which vehicle is to be picked up and delivered to an end customer (i.e., a car dealership). The system may also provide the truck driver with the quadrant that the vehicle is located within to further assist the driver with more quickly locating the spot location. After the correct vehicle is loaded onto the truck 52 based on the known parking spot number provided to the truck driver, another transceiver 22B may read the transmitter 16 on the truck 52 exiting the truck away area 48 when passing the guard shack 54. These steps are collectively shown at "STEP 8A" of FIG. 1. In one implementation, STEP 8A occurs subsequent to STEP 7A, however it may be possible for these steps to occur in a different order.

Some of the manufactured items may be positioned in the rail away area 50. When a train engineer or other train working needs to pick up one or more of the manufactured items 14 from the rail away area 50, the manufacturer or plant property owner may provide a list of parking spot locations to the train operator or worker. The parking lot locations of the manufactured items 14 (i.e., vehicles) are previously created and stored in the database based on the GPS-based geolocation coordinates registered against the previously surveyed parking lot spaces. By providing the train worker with the exact spot of the vehicle that he needs to pick up and load onto the train 56, the system 10 should eliminate any guess work by the train worker as to which vehicle is to be picked up and delivered to an end customer (i.e., a car dealership). The system 10 may also provide the train driver with the quadrant that the vehicle is located within to further assist the train employee or worker with more quickly locating the spot location. After the correct vehicle is loaded onto the train 56 based on the known parking spot number provided to the train worker, another transceiver 20F may read the transmitter 16 on the vehicle exiting the rail away area 50. These steps are collectively shown at "STEP 8B" of FIG. 1. In one implementation, STEP 8A occurs simultaneous or near in time or as an alternative to STEP 8A, however it may be possible for these steps to occur in a different order.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computercentric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a nontransitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computerreadable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an example," "an implementation," "one implementation," or "other embodiments," or the like, means that a particular feature, structure, or characteristic described in connection with the embodiments is included in at least some embodiments, but not necessarily all embodiments, of the present disclosure. The various appearances "an embodiment," "one embodiment," "some embodiments," "one particular embodiment," various "examples," various "implementations," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. An asset tracking system, comprising: a transmitter coupled to a vehicle; a plurality of fixed transceivers positioned within a vehicle manufacturing facility at a plurality of fixed milestone locations associated with a manufacturing process for manufacturing vehicles, the plurality of fixed transceivers being operable for selectively obtaining information from the transmitter coupled to the vehicle, wherein, when the transmitter coupled to the vehicle is moved within a predetermined proximity of a nearby transceiver of the plurality of fixed transceivers, the nearby transceiver is configured to obtain the information from the transmitter coupled to the vehicle;
   a portable transceiver operable for selectively obtaining the information from the transmitter coupled to the vehicle, wherein the portable transceiver is adapted to operate at a low read power and read the transmitter upon being moved within a predetermined proximity of the transmitter coupled to the vehicle while the vehicle is within 4 feet, and the portable transceiver is configured to obtain the information from the transmitter coupled to the vehicle; and
   a global positioning system in communication with the plurality of fixed transceivers and portable transceiver, the global positioning system being operable for periodically or continuously providing a calculation of a geographic location of the transmitter coupled to the vehicle, wherein the information from the transmitter coupled to the vehicle and the calculation of the geographic location of the transmitter coupled to the vehicle are communicated to a central server disposed remotely from the plurality of fixed transceivers and the portable receiver, and the central server is configured to determine a parking space the vehicle is parked in based on the geographic location and associate the vehicle with the parking space.

2. The asset tracking system of claim 1, wherein the information from the transmitter coupled to the vehicle comprises a vehicle identification number.

3. The asset tracking system of claim 1, wherein the transmitter comprises a radio frequency identification tag.

4. The asset tracking system of claim 1, wherein the information from the transmitter coupled to the vehicle and the calculation of the geographic location of the transmitter coupled to the vehicle are communicated to an entity responsible for retrieving and shipping the vehicle to another location.

5. The asset tracking system of claim 4, wherein the calculation of the geographic location of the transmitter coupled to the vehicle is translated to information corresponding to a previously identified location in the storage lot exterior to the vehicle manufacturing facility.

6. The asset tracking system of claim 1, further comprising a second portable transceiver adapted to operate at a higher power than the portable transceiver, wherein the central server is configured to (1) determine a quadrant of one of an overflow and a repair area that the vehicle is located in based on a geographic location determined from the second portable transceiver reading the transmitter coupled to the vehicle and (2) associate the vehicle with the quadrant, wherein the second portable transceiver is mounted to a second vehicle.

7. An asset tracking method, comprising:
   providing a transmitter coupled to a vehicle;
   providing a plurality of fixed transceivers positioned within a vehicle manufacturing facility at a plurality of fixed milestone locations associated with a manufacturing process for manufacturing vehicles, the plurality of fixed transceivers being operable for selectively obtaining information from the transmitter coupled to the vehicle, wherein, when the transmitter coupled to the vehicle is moved within a predetermined proximity of a nearby transceiver of the plurality of fixed transceivers, the nearby transceiver is configured to obtain the information from the transmitter coupled to the vehicle;
   providing a portable transceiver operable for selectively obtaining the information from the transmitter coupled to the vehicle, wherein the portable transceiver is adapted to operate at a low read power and read the transmitter upon being moved within a predetermined proximity of the transmitter coupled to the vehicle while the vehicle is at a fixed location exterior to the vehicle manufacturing facility, the predetermined proximity is within 4 feet, and the portable transceiver is configured to obtain the information from the transmitter coupled to the vehicle; and
   providing a global positioning system in communication with the plurality of fixed transceivers and portable transceiver, the global positioning system being operable for periodically or continuously providing a calculation of a geographic location of the transmitter coupled to the vehicle, wherein the information from the transmitter coupled to the vehicle and the calculation of the geographic location of the transmitter coupled to the vehicle are communicated to a central server disposed remotely from the plurality of fixed transceivers and the portable receiver, the method further comprising determining at the central server, a parking space the vehicle is parked in based on the geographic location and associating, at the central server, the vehicle with the parking space.

8. The asset tracking method of claim 7, wherein the information from the transmitter coupled to the vehicle comprises a vehicle identification number.

9. The asset tracking method of claim 7, wherein the transmitter comprises a radio frequency identification tag.

10. The asset tracking method of claim 7, wherein the information from the transmitter coupled to the vehicle and the calculation of the geographic location of the transmitter coupled to the vehicle are communicated to an entity responsible for retrieving and shipping the vehicle to another location.

11. The asset tracking method of claim 10, wherein the calculation of the geographic location of the transmitter coupled to the vehicle is translated to information corresponding to a previously identified location in the storage lot exterior to the vehicle manufacturing facility.

12. The asset tracking method of claim 7, further comprising: providing a second portable transceiver adapted to operate at a higher power than the portable transceiver; determining, at the central server, a quadrant of one of an overflow and a repair area that $J_1e$ is located in based on a geographic location determined from the second portable transceiver reading the transmitter coupled to the vehicle; and associating, at the central server, the vehicle with the quadrant, wherein the second portable transceiver is mounted to a second vehicle.

* * * * *

UNITED STATES PATENT AND TRADEMARK OFFICE
CERTIFICATE OF CORRECTION

PATENT NO. : 11,138,553 B2
APPLICATION NO. : 15/950454
DATED : October 5, 2021
INVENTOR(S) : William Wappler et al.

Page 1 of 1

It is certified that error appears in the above-identified patent and that said Letters Patent is hereby corrected as shown below:

On the Title Page

Column 1, Item (73) Assignee Information:
Correct Assignee's name from "SURGERE, INC." to – SURGERE, LLC –

Signed and Sealed this
Thirtieth Day of August, 2022

Katherine Kelly Vidal
*Director of the United States Patent and Trademark Office*